US011981190B1

(12) United States Patent
Yormak

(10) Patent No.: US 11,981,190 B1
(45) Date of Patent: May 14, 2024

(54) SYSTEMS AND METHODS FOR A VEHICLE ENCLOSURE SYSTEM

(71) Applicant: TopHat Cart Enclosures and Accessories LLC, Sheridan, WY (US)

(72) Inventor: Jeffrey H. Yormak, Palm Beach Gardens, FL (US)

(73) Assignee: TopHat Cart Enclosures and Accessories LLC, Sheridan, WY (US)

( * ) Notice: Subject to any disclaimer, the term of this patent is extended or adjusted under 35 U.S.C. 154(b) by 0 days.

(21) Appl. No.: 18/466,584

(22) Filed: Sep. 13, 2023

(51) Int. Cl.
*B60J 5/04* (2006.01)
*B60J 1/02* (2006.01)
*B60J 1/18* (2006.01)
*E05F 11/04* (2006.01)
*E05F 15/611* (2015.01)

(52) U.S. Cl.
CPC ............... *B60J 5/0487* (2013.01); *B60J 1/02* (2013.01); *B60J 1/1838* (2013.01); *E05F 11/04* (2013.01); *E05F 15/611* (2015.01); *E05Y 2900/53* (2013.01)

(58) Field of Classification Search
CPC ... B60J 5/0478; B60J 18/38; B60J 1/02; B60J 1/025; B60J 1/04; B60J 1/1823
USPC ................................................... 296/148, 83
See application file for complete search history.

(56) References Cited

U.S. PATENT DOCUMENTS

| | | | |
|---|---|---|---|
| 3,958,826 A * | 5/1976 | Upton | B60J 1/04 280/DIG. 5 |
| 6,216,714 B1 * | 4/2001 | Tucker | E04H 15/06 160/122 |
| 6,276,745 B1 | 8/2001 | Wilson | |
| 6,416,109 B1 * | 7/2002 | Tyrer | B60J 7/10 296/100.11 |
| 6,773,052 B1 * | 8/2004 | Tyrer | B60J 7/10 296/100.11 |
| 6,851,739 B2 * | 2/2005 | Morley | B60J 7/11 296/141 |
| 6,902,220 B2 | 6/2005 | Moskos et al. | |

(Continued)

FOREIGN PATENT DOCUMENTS

| | | |
|---|---|---|
| KR | 102400225 B1 | 5/2022 |
| KR | 20230061753 A | 5/2023 |

OTHER PUBLICATIONS

Michaelhmts, Retractable Roller Golf Cart Enclosure, YouTube Video, Posted Nov. 14, 2013, Accessed Oct. 9, 2023, https://www.youtube.com/watch?v=Y3HBwS3sw7s.

*Primary Examiner* — Jason S Morrow
(74) *Attorney, Agent, or Firm* — Duane Morris LLP

(57) ABSTRACT

A vehicle enclosure system may include a top rail and a bottom rail coupled to a side of a vehicle. The vehicle enclosure system may also include a housing coupled to the side of the vehicle. The housing may include a covering coupled to at least one handle. The at least one handle may be configured to facilitate a movement of the covering by a user. The housing may include a roller configured to facilitate the movement and storage of the covering. The vehicle enclosure system may include a rear cover assembly coupled to the housing and the covering. The covering may enclose an interior of the vehicle and extend the rear cover assembly simultaneously when the covering is moved to a deployed position. The covering may expose the interior of the vehicle and store the rear cover assembly simultaneously when the covering is moved to a storage position.

30 Claims, 18 Drawing Sheets

(56) References Cited

U.S. PATENT DOCUMENTS

| | | | | |
|---|---|---|---|---|
| 7,354,092 | B2* | 4/2008 | Showalter | B62D 33/0621 |
| | | | | 296/77.1 |
| 7,740,300 | B2* | 6/2010 | Marsh | B60J 5/0487 |
| | | | | 296/77.1 |
| 7,832,788 | B2 | 11/2010 | Marsh et al. | |
| 8,069,899 | B2* | 12/2011 | Nation | E04F 10/06 |
| | | | | 160/56 |
| 8,303,020 | B1* | 11/2012 | Held | B60J 7/1278 |
| | | | | 296/99.1 |
| 8,312,911 | B2 | 11/2012 | Haagenson | |
| 8,356,855 | B2 | 1/2013 | Sams | |
| 9,156,336 | B2* | 10/2015 | Fennell | B60J 5/08 |
| 9,254,734 | B2 | 2/2016 | Held | |
| 10,239,393 | B2 | 3/2019 | Held | |
| 2005/0161971 | A1* | 7/2005 | Wilson | B60J 1/04 |
| | | | | 296/79 |
| 2007/0246092 | A1* | 10/2007 | Gerrie | B60J 7/067 |
| | | | | 135/88.07 |
| 2011/0001330 | A1 | 1/2011 | Hirneise | |
| 2014/0311691 | A1* | 10/2014 | Newell | B60J 1/04 |
| | | | | 160/323.1 |
| 2022/0134851 | A1 | 5/2022 | Lin et al. | |

\* cited by examiner

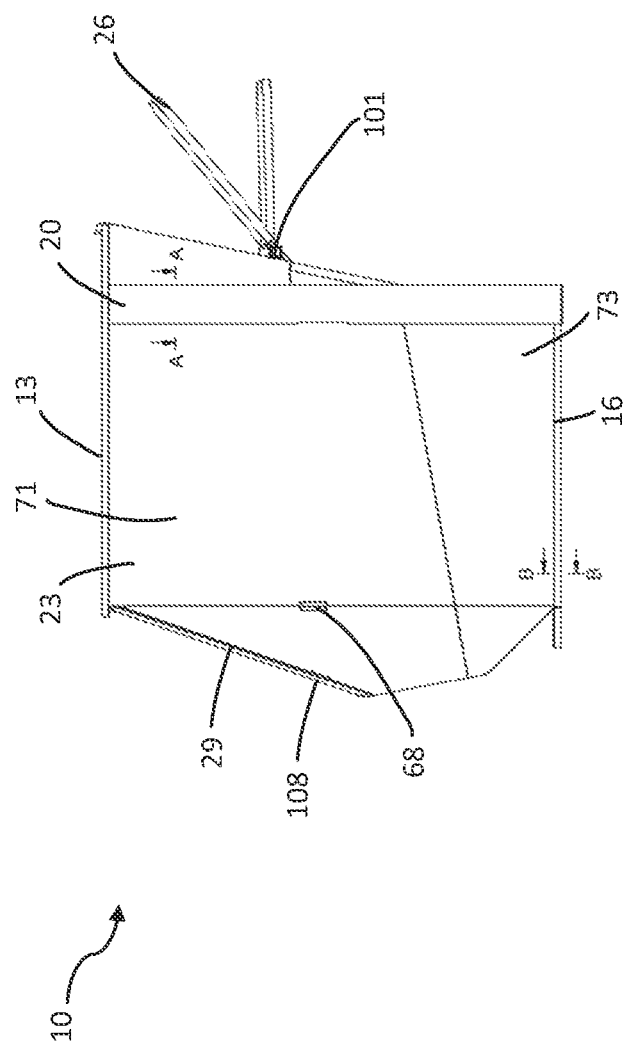

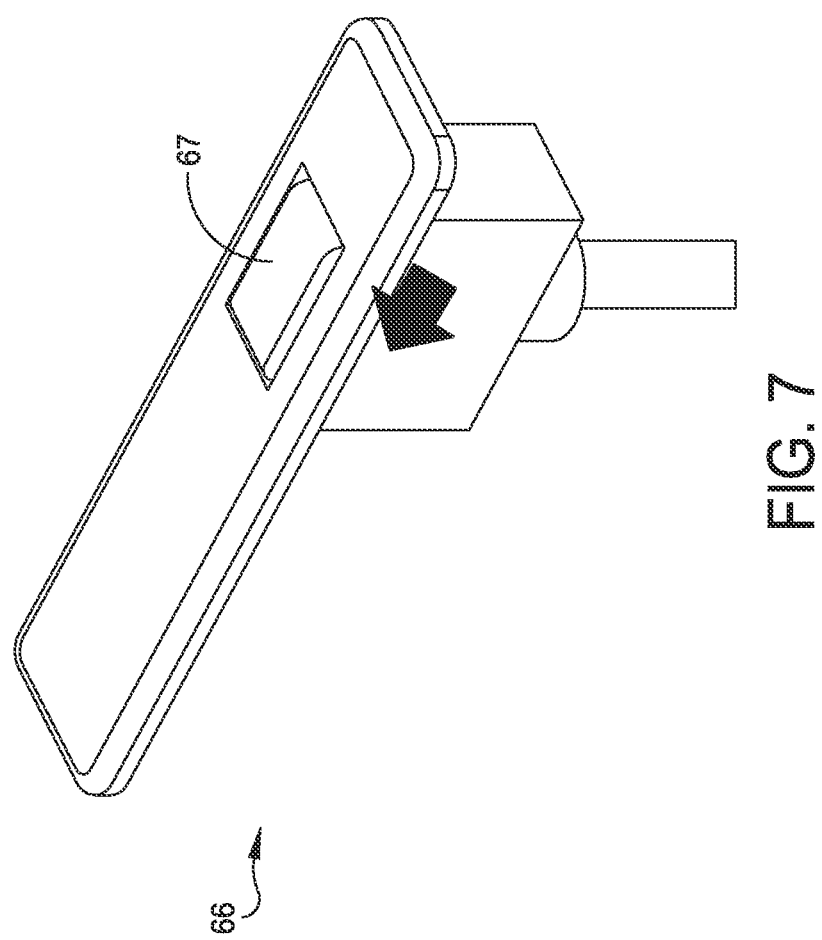

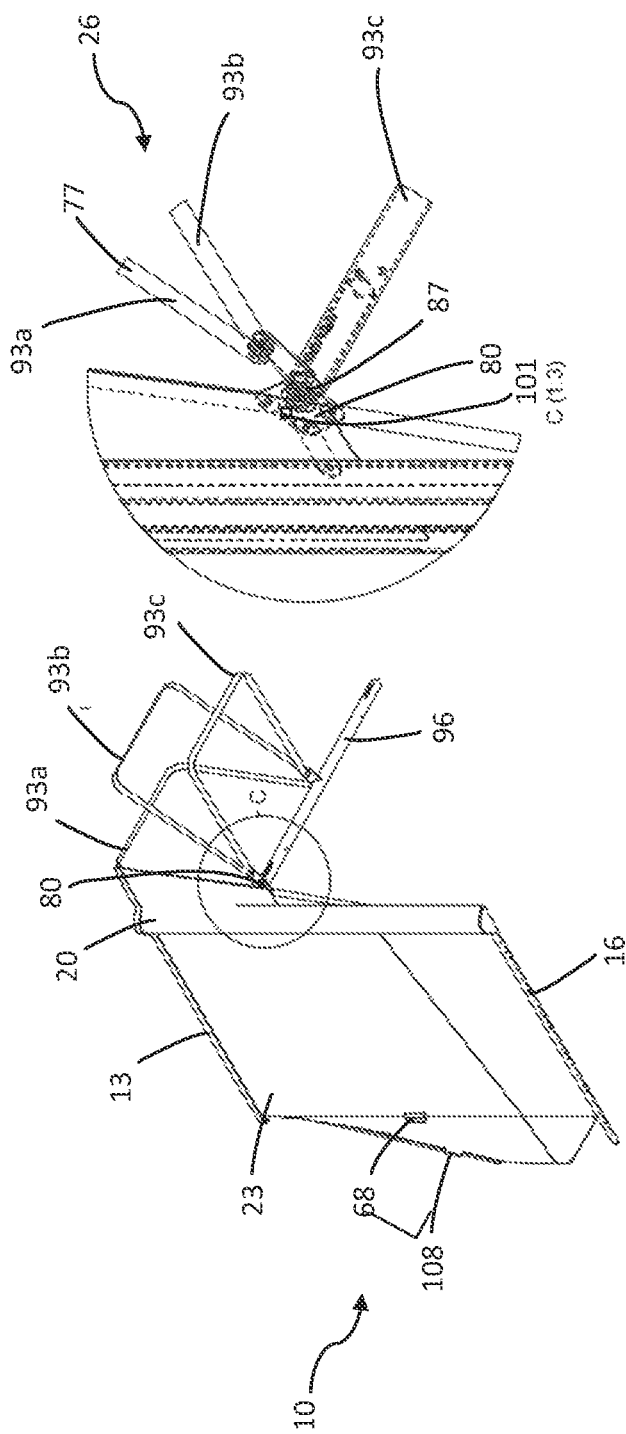

SYSTEMS AND METHODS FOR A VEHICLE ENCLOSURE SYSTEM

FIELD OF DISCLOSURE

The disclosed systems and methods are directed to an enclosure system. More specifically, the present disclosure relates to a vehicle enclosure system configured to enclose a vehicle and cover a back portion of the vehicle.

BACKGROUND

Conventional vehicle enclosure systems, such as golf cart enclosure systems, utilize covering material that is broken up in divided sections. When a user wants to deploy the covering material, they must individually and manually roll down each divided section. Subsequently, each of the divided sections must be zipped or snapped together to fully enclose the vehicle. In order to enter and exit the vehicle, the user must unzip or unbutton a section of the enclosure each time. Further, when a user wants to store the enclosure system, each section must be unzipped/unbuttoned and manually rolled back up and secured to the vehicle in their original position.

Additionally, due to the size and shape of various vehicles that use enclosure systems, the divided sections and securing mechanisms, such as buttons, must be custom fit and precisely attached to the vehicle in order to adequately enclose the vehicle. Thus, traditional enclosure systems can be burdensome to employ over a variety of different types and models of vehicles.

Accordingly, there has been a long felt need to simplify and automate the systems used to enclose a vehicle over a variety of vehicle models. The present disclosure addresses the shortcomings of conventional enclosure systems and allows quick deployment and storage of the enclosure system as well as quick entry and exit of the vehicle.

SUMMARY

In some embodiments, a vehicle enclosure system may include a top rail and a bottom rail coupled to a side of a vehicle. The vehicle enclosure system may also include a housing coupled to the side of the vehicle. The housing may include a covering coupled to at least one handle. The at least one handle may be configured to facilitate a movement of the covering by a user. The housing may include a roller configured to facilitate the movement and storage of the covering. The vehicle enclosure system may include a rear cover assembly coupled to the housing and the covering. The covering may enclose an interior of the vehicle and extend the rear cover assembly simultaneously when the covering is moved to a deployed position. The covering may expose the interior of the vehicle and store the rear cover assembly simultaneously when the covering is moved to a storage position.

In some embodiments, a vehicle enclosure system includes a top rail and a bottom rail coupled to each of a left side and a right side of a vehicle. The vehicle enclosure system may include a housing coupled to each of the left side and the right side of the vehicle. The housing on each of the left side and the right side of the vehicle may include a covering coupled to at least one handle. The at least one handle may be configured to facilitate a movement of the covering by a user. The housing may include a roller configured to facilitate the movement and storage of the covering. The vehicle enclosure system may include a motor coupled to the side of the housing and comprising a clutch configured to engage and disengage the roller. The vehicle enclosure system may include a rear cover assembly coupled to the housing on each of the left side and the right side. The covering on the left side and the right side may enclose an interior on the respective left and right side of the vehicle and extend the rear cover assembly on the respective left side and the right side of the vehicle simultaneously when the covering on the left side and right side is moved to a deployed position. The covering may expose the interior on the respective left side and the right side of the vehicle and store the rear cover assembly on the respective left side and the right side simultaneously when the covering is moved to a storage position.

In some embodiments, a method may include moving a covering along a top rail and a bottom rail coupled to a side of a vehicle. The covering may be stored and extended from a housing coupled to the side of the vehicle. A motor may be coupled to a side of the housing. The method may include attaching a variable covering to a magnetic bracket on the vehicle. The method may include extending a rear cover assembly coupled to the housing over a back portion of the vehicle.

BRIEF DESCRIPTION OF THE DRAWINGS

The features and advantages of the present disclosure will be more fully disclosed in, or rendered obvious by, the following detailed descriptions of example embodiments. The detailed descriptions of the example embodiments are to be considered together with the accompanying drawings wherein like numbers refer to like parts and further wherein:

FIG. 4 illustrates a side view of a structure of a vehicle enclosure system deployed in accordance with some embodiments;

FIG. 7 illustrates an isometric view of a runner carriage of a vehicle enclosure system in accordance with some embodiments;

FIG. 8A illustrates an isometric view of a rear cover assembly of a vehicle enclosure system in accordance with some embodiments;

FIG. 8B illustrates a side view of a rear cover assembly of a vehicle enclosure system in accordance with some embodiments;

Figure 1A:
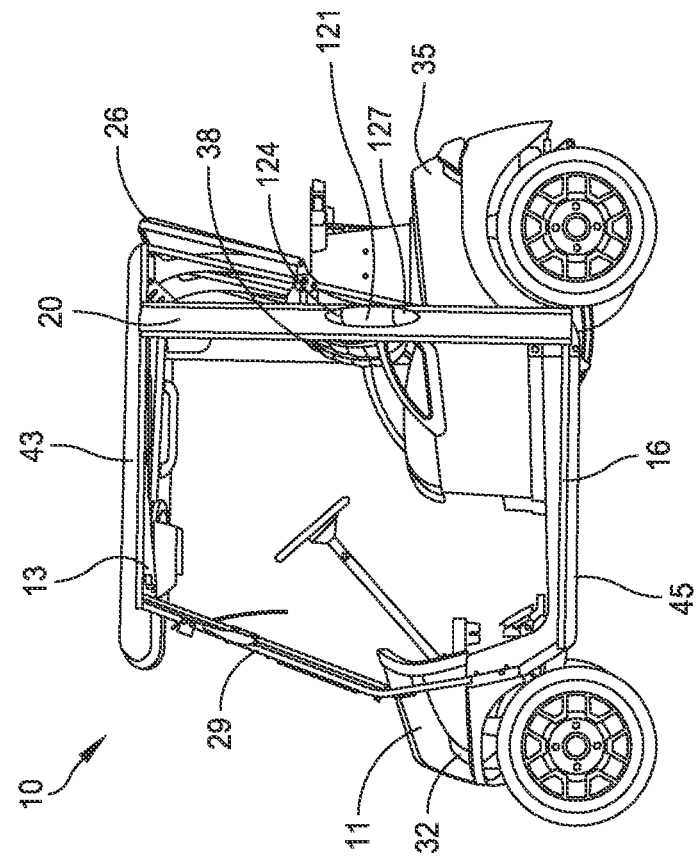
FIG. 1A illustrates an isometric view of a vehicle enclosure system stored in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

This description of the exemplary embodiments is intended to be read in connection with the accompanying drawings, which are to be considered part of the entire written description. It should be understood, however, that the present disclosure is not intended to be limited to the particular forms disclosed and that the drawings are not necessarily shown to scale. Rather, the present disclosure covers all modifications, equivalents, and alternatives that fall within the spirit and scope of these exemplary embodiments. In the description, relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The terms "couple," "coupled," "operatively coupled," "operatively connected," and the like should be broadly understood to refer to connecting devices or components together either mechanically, or otherwise, such that the connection allows the pertinent devices or components to operate with each other as intended by virtue of that relationship.

The devices, systems, and methods being disclosed enable the installation of the enclosure system on different vehicles having various shapes and sizes. However, parts of the enclosure system being disclosed could also be used in other applications, such as blinds, pool covers, sliding doors, etc. The enclosure system of the present disclosure allows for quick deployment to enclose a vehicle and storage of the enclosure system to expose the interior of the vehicle when needed. The enclosure system of the present disclosure also allows passengers to quickly enter and exit the vehicle after the enclosure system is deployed.

Figure 1B:
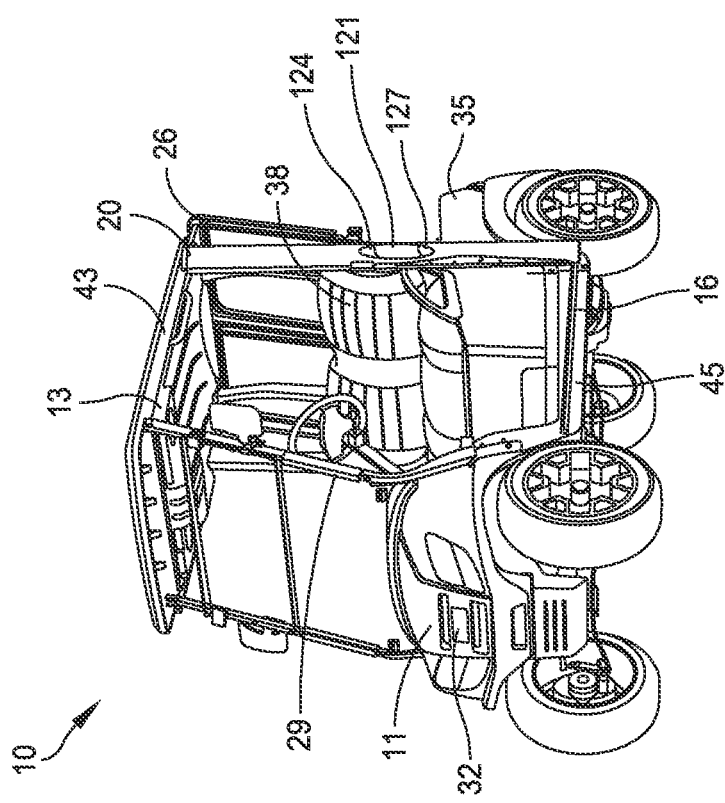
FIG. 1B illustrates a side view of a vehicle enclosure system stored in accordance with some embodiments.
Figure 2:
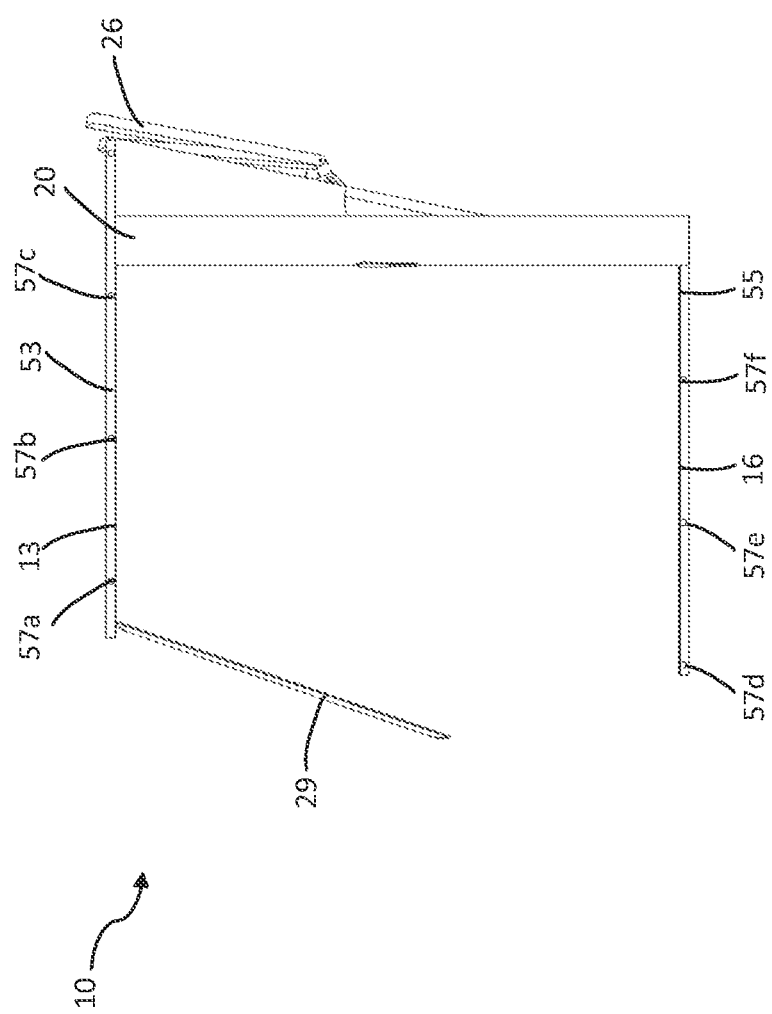
FIG. 2 illustrates a side view of a structure of a vehicle enclosure system stored in accordance with some embodiments.
Figure 3A:
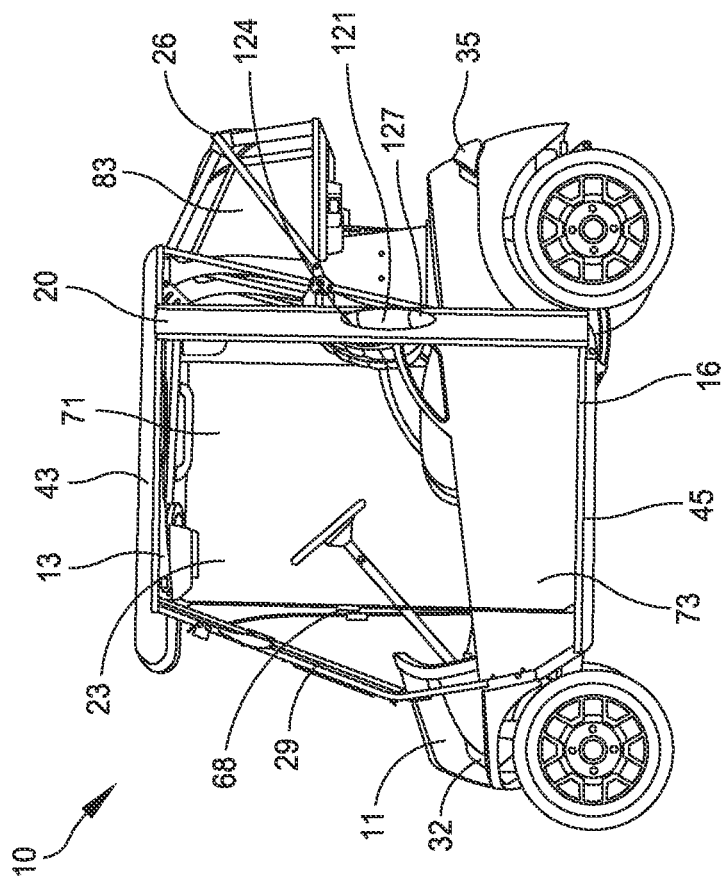
FIG. 3A illustrates a front isometric view of a vehicle enclosure system deployed in accordance with some embodiments.
Figure 3B:
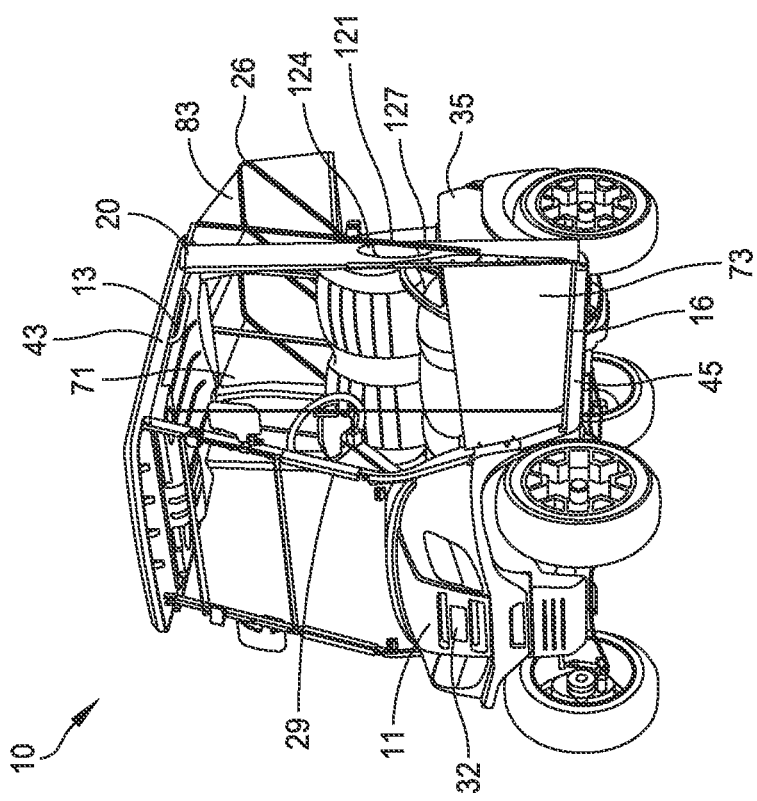
FIG. 3B illustrates a side view of a vehicle enclosure system deployed in accordance with some embodiments.
Figure 3C:
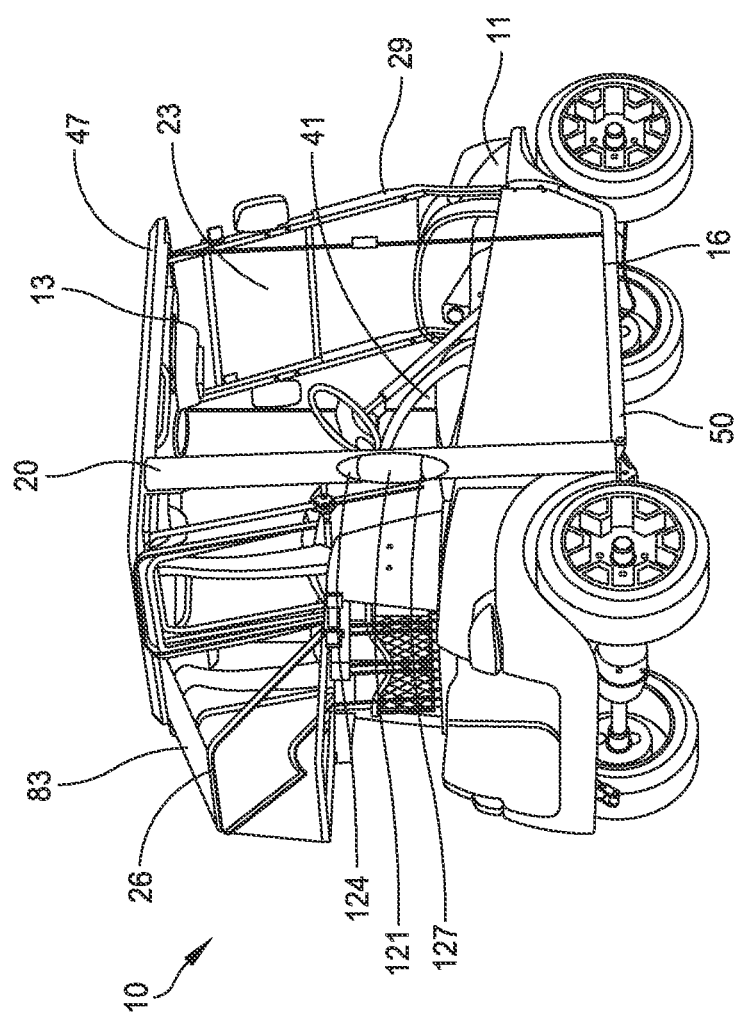
FIG. 3C illustrates a rear isometric view of a vehicle enclosure system deployed in accordance with some embodiments.

FIGS. 1A-2 illustrate a vehicle enclosure system 10 stored in accordance with some embodiments. FIGS. 3A-4 illustrate vehicle enclosure system 10 deployed in accordance with some embodiments. Vehicle enclosure system 10 is configured to be operatively coupled to vehicle 11 and includes a top rail 13 and a bottom rail 16, a housing 20, a covering 23, a rear cover assembly 26, and optionally a magnetic bracket 29. Vehicle 11 comprises a front portion 32, a back portion 35, a left side 38, and a right side 41. Left side 38 is disposed between a top portion 43 and a bottom portion 45. Right side 41 is disposed between a top portion 47 and a bottom portion 50.

Top rail 13 comprises a groove 53 within top rail 13. Bottom rail 16 also comprises a groove 55 within bottom rail 16. Top rail 13 is configured to be operatively coupled to the top portion 43 or 47 of a side (i.e., left side 38 or right side 41) of vehicle 11. Bottom rail 16 is configured to be operatively coupled to the bottom portion 45 and 50 of a side (i.e., left side 38 or right side 41) of vehicle 11. Top rail 13 and bottom rail 16 are coupled to vehicle 11 with at least one attachment mechanism 57a-g. In a non-limiting example, attachment mechanisms 57a-g can include but are not limited to adhesive, rivets, screws, or other type of fasteners. Top rail 13 and bottom rail 16 may be made of any suitable, stable material such as metal, metal alloy, or plastic.

Figure 6:
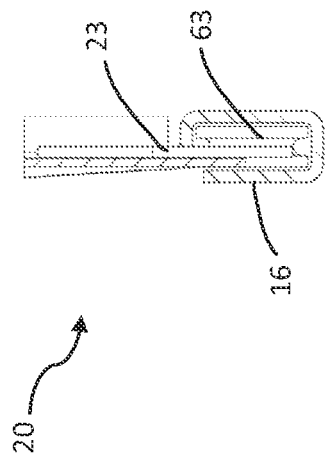
FIG. 6 illustrates another top down view of a housing of a vehicle enclosure system in accordance with some embodiments.
Figure 5:
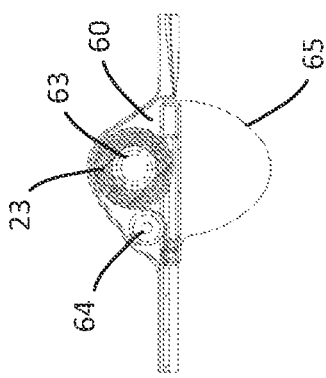
FIG. 5 illustrates a top down view of a housing of a vehicle enclosure system in accordance with some embodiments.

FIG. 5 illustrates a top down view of housing 20 of vehicle enclosure system 10 in accordance with some embodiments. FIG. 6 illustrates another top down view of housing 20 of vehicle enclosure 10 in accordance with some embodiments. Housing 20 defines a void 60 sized to receive covering 23 and a roller 63. Housing 20 is operatively coupled to a side (i.e., the left side 38 or the right side 41) of vehicle 11. Housing 20 may be cylindrical, rectangular, or oblong in shape. Housing 20 may be made of any suitable, sturdy material, such as metal, metal alloy, or plastic. In some embodiments, housing 20 includes an operating mechanism 65, such as a cable or pulley system, configured to move covering 23. For example, a user of vehicle enclosure system 10 may pull on covering 23, allowing operating mechanism 65 to rotate roller 63 and deploy covering 23 along top rail 13 and bottom rail 16 as illustrated in FIG. 6. In some embodiments, vehicle enclosure system 10 includes an alignment roller 64 to facilitate smooth deployment of covering 23.

FIG. 7 illustrates a runner carriage 66 of a vehicle enclosure system 10 in accordance with some embodiments. Runner carriage 66 is coupled to the top and bottom of covering 23. Runner carriage 66 is configured to move covering 23, as shown by the directional arrow illustrated in FIG. 7, along top rail 13 and bottom rail 16. Runner carriage 66 may also include a locking mechanism 67 disposed on a top portion of runner carriage 66. Referring back to FIGS. 3A-4, covering 23 also includes at least one handle 68 coupled to covering 23. Handle 68 is configured to be operated by a user to move the covering 23, facilitated by the runner carriage 66 on the top and bottom of covering 23, between grooves 53 and 55 of top rail 13 and bottom rail 16, respectively. When handle 68 is operated, locking mechanism 67 retracts into runner carriage 66 so that covering 23 may be moved along top rail 13 and bottom rail 16. When handle 68 is released, locking mechanism 67 extends into top rail 13 and/or bottom rail 16 to secure covering 23 in either a stored or deployed position. Covering 23 may be made of any suitable, sturdy material that will provide protection from the elements (e.g., wind, rain, snow, etc.) such as plastic, fabric, etc. However, in some embodiments, covering 23 can be made of a waterproof and ultraviolet (UV) ray resistant fabric material.

In some embodiments, covering 23 has internal cord linkages (not shown) to ensure that covering 23 is smooth and does not come out of alignment. In some embodiments, covering 23 may be made up of different sections, such as a top section 71 and a bottom section 73. In some embodiments, top section 71 and bottom section 73 are of different materials. For example, top section 71 may be made of a transparent material and bottom section 73 may be made of an opaque material. In other embodiments, top section 71 and bottom section 73 are made of the same material.

Figure 9A:
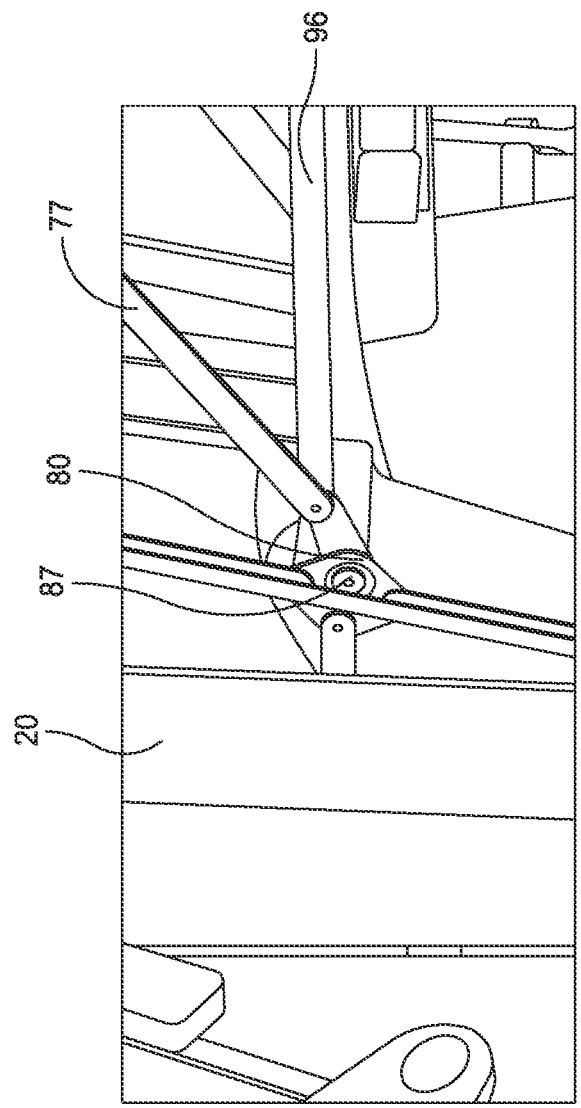
FIG. 9A illustrates an isometric view of a frame of a rear cover assembly in accordance with some embodiments.
Figure 9C:
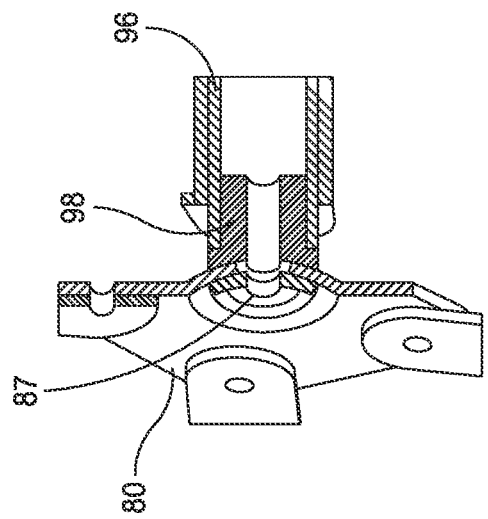
FIG. 9C illustrates a cross-sectional view of a frame of a rear cover assembly in accordance with some embodiments.
Figure 9B:
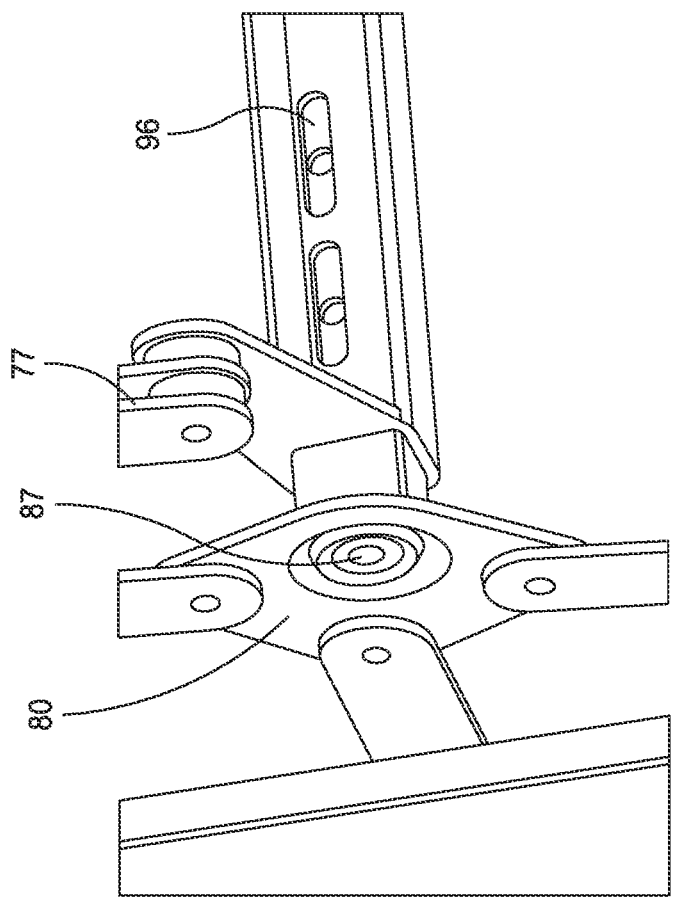
FIG. 9B illustrates an isometric view of a frame of a rear cover assembly in accordance with some embodiments.

FIGS. 8A-8B illustrate rear cover assembly 26 of vehicle enclosure system 10 in accordance with some embodiments. FIGS. 9A-9C illustrate a frame 77 of rear cover assembly 26 in accordance with some embodiments. Rear cover assembly 26 includes a frame 77, a linkage 80, a shield 83 (illustrated in FIGS. 2A-2C), and a rotation mechanism 87. Frame 77 includes at least one frame member 93a-c and is operatively coupled to housing 20 through linkage 80. Frame members 93a-c are configured to support shield 83. Frame members 93a-c are also configured to extend as linkage 80 is moved, covering all or part of back portion 35 of vehicle 11.

Shield 83 is coupled to frame 77 and is supported with at least one frame member 93a-c. Shield 83 may be the same material as covering 23 as discussed above or may be made of other suitable material to cover all or a part of back portion 35 of vehicle 11. For example, shield 83 may be made of a waterproof and UV ray resistant material or fabric. In some embodiments, shield 83 may be made of a rigid material, such as plastic.

Linkage 80 is coupled to housing 20 and frame 77. Linkage 80 includes a lateral brace 96 operatively coupled to frame 77. Lateral brace 96 also includes a ball joint 98 on either side of lateral brace 96. Ball joints 98 are configured to allow lateral brace 96 to be repositioned based on the shape and size of vehicle 11. Linkage 80 is configured to telescope and extend rear cover assembly 26 over all or a part of back portion 35 when operated.

Rotation mechanism 87 is configured to rotate rear cover assembly 26 so that rear cover assembly extends and covers at least part of back portion 35. In some embodiments, rotation mechanism 87 is a torsion spring that works to rotate and extend rear cover assembly 26 based on the force of the spring. It will be appreciated that other rotation mechanisms may be used in place of a torsion spring, such as a counter weight system and is not limited by the example discussed herein.

Locking mechanism 67 is also configured to secure frame 77 and shield 83 in a storage position (e.g., open or storage) or deployed position (e.g., closed) when extended into top rail 13 and/or bottom rail 16. For example, locking mechanism 67 may secure rear cover assembly 26 in a storage position when vehicle enclosure system 10 is stored. Locking mechanism 67 may also secure rear cover assembly 26 in a deployed position when vehicle enclosure system 10 is deployed. In some embodiments, a release mechanism 101 is operatively coupled to linkage 80 as illustrated in FIGS. 4 and 8B. Release mechanism 101 may allow a user to move rear cover assembly 26 independently of covering 23. For example, release mechanism 101 may be a button, switch, or lever that releases rear cover assembly 26 and allows independent movement so that rear cover assembly 26 can be opened and closed while covering 23 is deployed or stored.

Figure 10C:
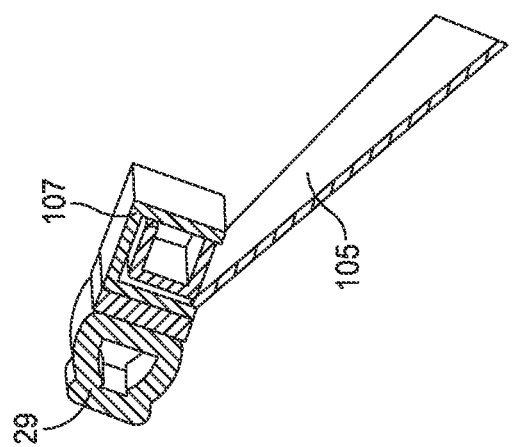
FIG. 10C illustrates a cross-sectional view of a magnetic bracket of a vehicle enclosure system in accordance with some embodiments.
Figure 10B:
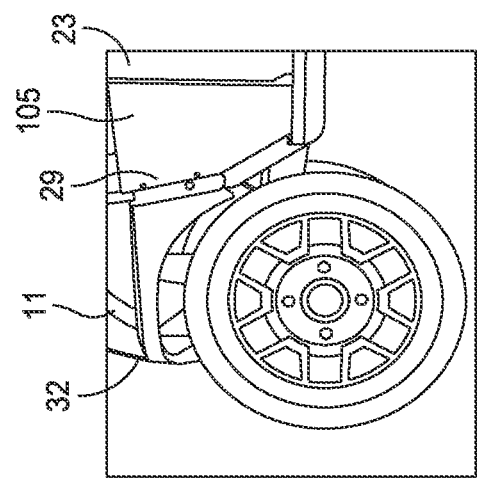
FIG. 10B illustrates a side view of a magnetic bracket of a vehicle enclosure system in accordance with some embodiments.
Figure 10A:
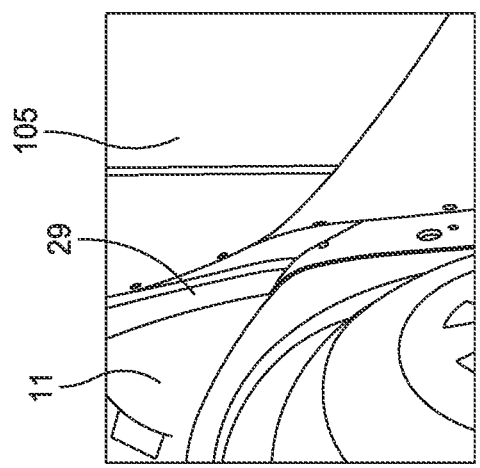
FIG. 10A illustrates a view of a magnetic bracket of a vehicle enclosure system in accordance with some embodiments.

FIGS. 10A-10C illustrate magnetic bracket 29 of vehicle enclosure system 10 in accordance with some embodiments. Magnetic bracket 29 may be operatively coupled to a forward portion of left side 38 and/or right side 41 of vehicle 11. Magnetic bracket 29 may also run from the top portion 43, 47 to the bottom portion 45, 50 of left side 38 and right side 41, respectively. Magnetic bracket 29 is configured to magnetically attach to a variable covering 105 section of covering 23 through an interlocking attachment 107. For example, once covering 23 is fully deployed along top rail 13 and bottom rail 16, a second handle 108, illustrated in FIGS. 4 and 8A, may be rotated upward. Interlocking attachment 107 may then magnetically attach to magnetic bracket 29 sealing the interior of vehicle 11 from the elements (e.g., wind, rain, hail, snow, etc.). Interlocking attachment 107 is attached to variable covering 105 and allows the use of a customized trim covering, such as covering 23 and/or variable covering 105, to fit vehicle 11. Although the present disclosure uses magnetic couplings to enclose vehicle 11, it will be appreciated that other coupling mechanisms may also be used, such as zippers, buttons, snaps, hook-and-loop, etc.

Figure 11B:
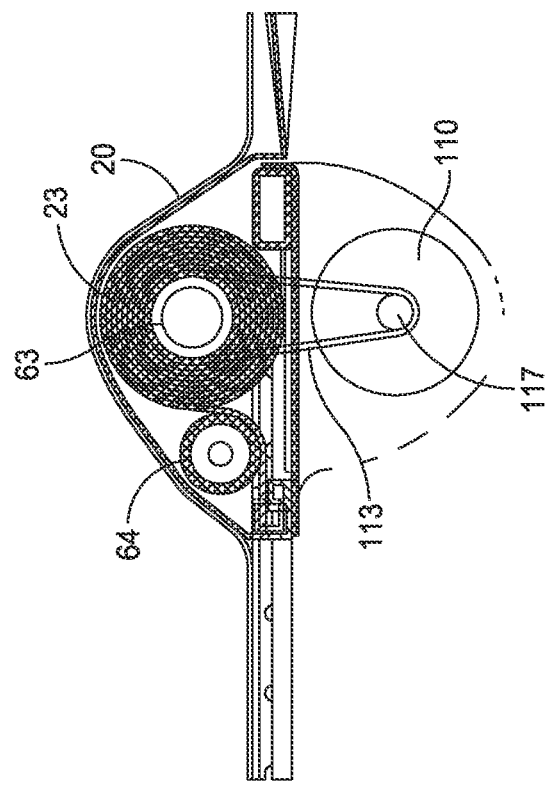
FIG. 11B illustrates a top down view of a motor coupled to a housing of a vehicle enclosure system in accordance with some embodiments.
Figure 11A:
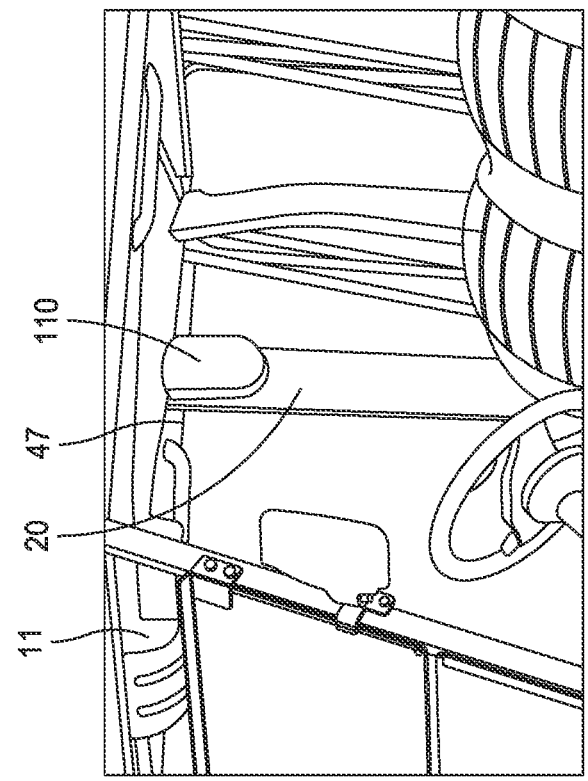
FIG. 11A illustrates an isometric view of vehicle enclosure system with a motor in accordance with some embodiments.
Figure 12A:
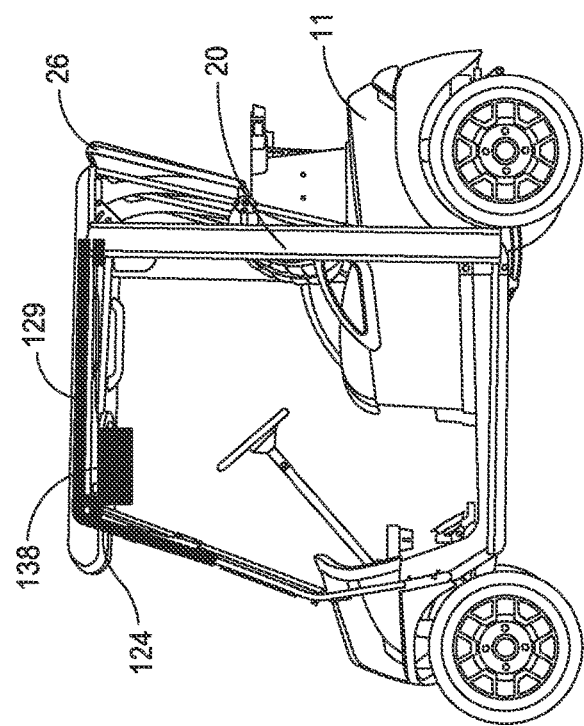
FIG. 12A illustrates a side view of a vehicle enclosure system with a front window stored in accordance with some embodiments.
Figure 12B:
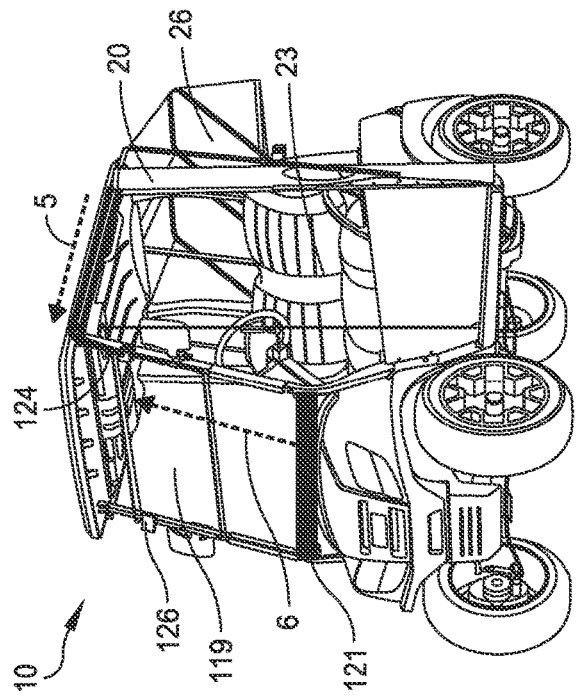
FIG. 12B illustrates an isometric view of a vehicle enclosure system with a front window deployed in accordance with some embodiments.
Figure 13:
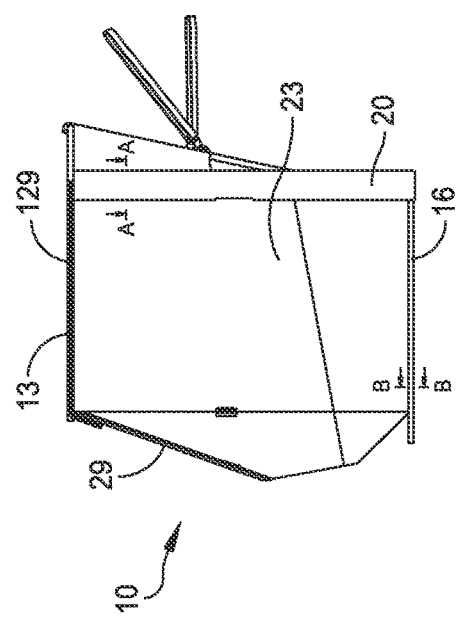
FIG. 13 illustrates a structure of a vehicle enclosure system deployed in accordance with some embodiments.
Figure 14:
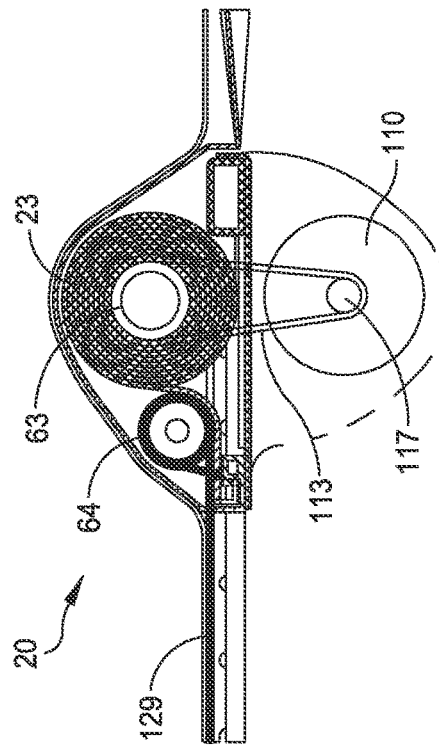
FIG. 14 illustrates a housing of a vehicle enclosure system with a front window in accordance with some embodiments.
Figure 15B:
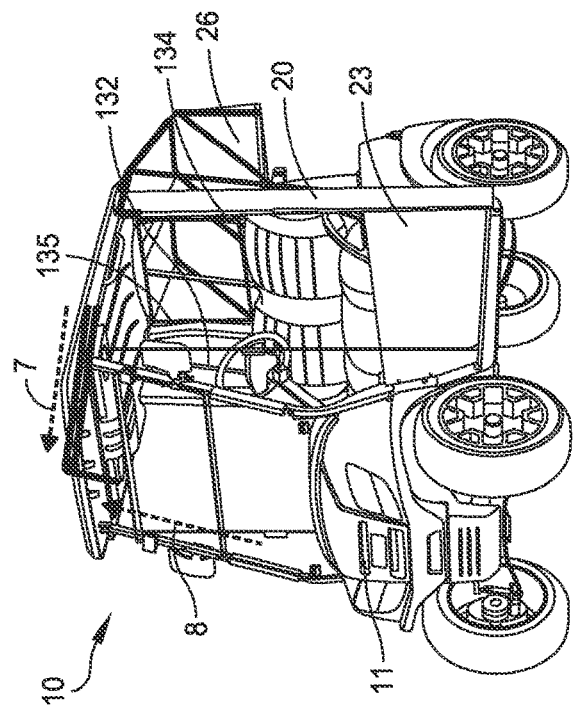
FIG. 15B illustrates another isometric view of a vehicle enclosure system with a back window in accordance with some embodiments.
Figure 17:
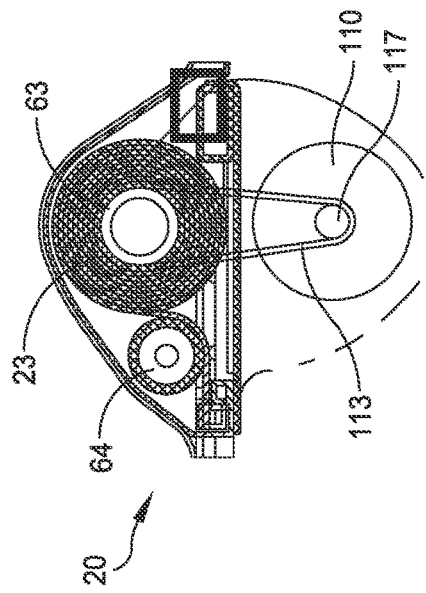
FIG. 17 illustrates a housing of a vehicle enclosure system with a back window in accordance with some embodiments.
Figure 15A:
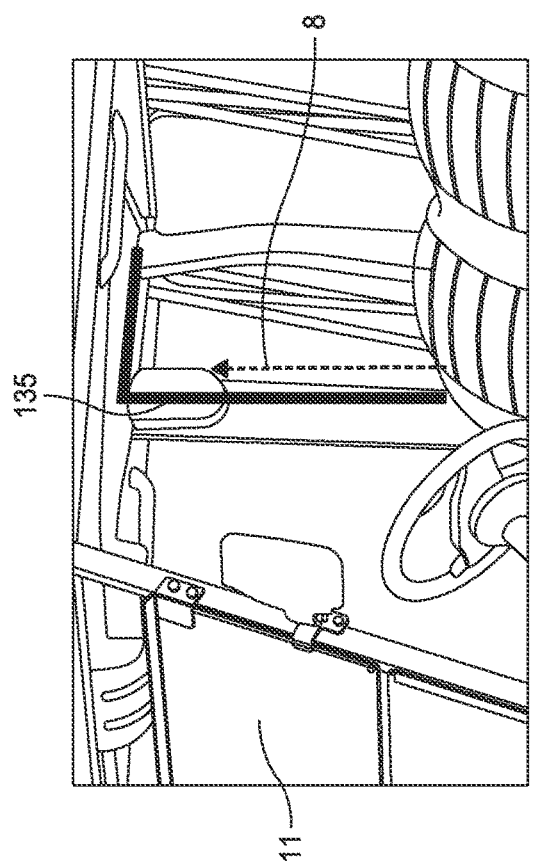
FIG. 15A illustrates an isometric view of a vehicle enclosure system with a back window in accordance with some embodiments.
Figure 16:
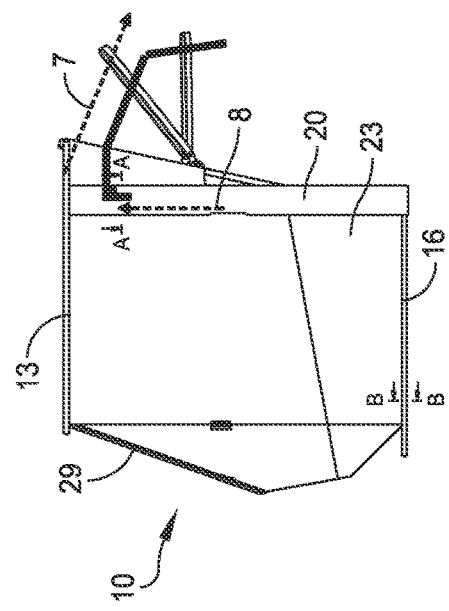
FIG. 16 illustrates a structure of a vehicle enclosure system with a back window in accordance with some embodiments.

FIGS. 11A-11B illustrate a motor 110 of a vehicle enclosure system in accordance with some embodiments. Vehicle enclosure system 10 may also include motor 110 operatively coupled to the side of housing 20. For example, motor 110 may be coupled to the side of housing 20 near top portion 43, 47 on the interior (i.e., inside) of vehicle 11, as illustrated in FIG. 11A. In other embodiments, motor 110 may be coupled to the side of housing 20 near bottom portion 45, 50 on the interior of vehicle 11. In other embodiments, motor 110 may be coupled to housing 20 on the exterior (i.e., outside) of vehicle 11. Motor 110 is connected to at least one cable 113 and configured to deploy and store covering 23 when motor 110 is operated.

Motor 110 can be controlled through the use of a an input/output device (not shown), such as a button or switch. Motor 110 can also be controlled by a computing device electrically connected to motor 110, such as computing device 200 discussed in further detail below, which may be disposed within housing 20. In some embodiments, a clutch 117 is included to ensure that the motor 110 is only engaged with roller 63 when the system is being opened and closed. For example, remote operation of vehicle enclosure system 10 causes computing device 200 to command clutch 117 to engage cable 113 so motor 110 can operate roller 63 and deploy (or store) vehicle enclosure system 10 (i.e., deployment and storage of covering 23, variable covering 23, and/or rear cover assembly 26). After completion of the deployment (or storage) of vehicle enclosure system 10, clutch 117 is commanded to disengage from cable 113 so vehicle enclosure system 10 may be operated manually without damaging motor 110.

FIGS. 12A-14 illustrate vehicle enclosure system 10 having a front window 119. In some embodiments, vehicle enclosure system 10 may also include front window 119. Front window 119 may be stored in a container 121, similar to housing 20. Front window 119 may be deployed along left track 124 and right track 126, similar to top rail 13 and bottom rail 16, on the front 32 of vehicle 11. A top cable 129 connects the runner carriage 66 to the front window 119, which is connected to tensioning pulleys (not shown) within container 121 and top rail 13. The tensioning pulleys are configured to move front window 119 in an upward direction along left track 124 and right track 126. For example, as illustrated by directional arrows 5 and 6 in FIG. 12B, movement of handle 68 in a forward direction (i.e., toward the front 32 of vehicle 11) may also move front window 119 in an upward (deployed) direction. Meaning movement of handle 68 when vehicle enclosure system 10 is stored will move front window 119 from a stored (down) to a deployed (up) position and vice versa. In some embodiments, front window 119 is equipped with a self-locking latch (not shown) to lock the front window 119 in a deployed position.

FIGS. 15A-17 illustrate vehicle enclosure system 10 having a back window 132. In some embodiments, vehicle enclosure system 10 may also include a back window 132. Back window 132 may be stored in a container (not shown), similar to container 121 and housing 20, behind the seats of vehicle 11. Back window 132 may be deployed along left track 134 and right track 135, similar to left track 124 and right track 126, on the back 35 of vehicle 11. Cable 113 and/or cable 129 that connects rear cover assembly 26 to housing 20 is also connected to back window 132 within the container behind the seats of vehicle 11. As rear cover assembly 26 moves, back window 132 is also configured to move. For example, as illustrated by directional arrows 7 and 8 in FIGS. 15A-16, movement of handle 68 in a forward direction (i.e., toward the front 32 of vehicle 11) may also move back window 132 in an upward (deployed) direction. Meaning movement of handle 68 when vehicle enclosure system 10 is stored will move back window 132 from a stored (down) to a deployed (up) position and vice versa. In some embodiments, back window 132 is equipped with a self-locking latch (not shown) to lock the back window 132 in a deployed position.

In some embodiments, vehicle enclosure system 10 includes both front window 119 and back window 132. In some embodiments, front window 119 and/or back window 132 are configured to be deployed in the down direction and stored in the up direction, opposite of the configurations described above. Although front window 119 and back window 132 are described as moving simultaneously with covering 23 and rear cover assembly 26, it will be appreciated that front window 119 and back window 132 may also be stored and deployed individually, similar to rear cover assembly 26. Also, although front window 119 and back window 132 are described as moving when handle 68 is manually moved, front window 119 and back window 132 may be configured to be deployed and stored through the use of motor 110 as described in more detail herein regarding the movement of covering 23 and extension of rear cover assembly 26. For example, an input/output device on motor 110 may also operate the front window 119 and/or back window 132. Additionally, a command from a computing device, such as computing device 200 described in more detail below, may also operate front window 119 and/or back window 132.

Referring back to FIG. 12A, vehicle enclosure system 10 may also include an environment control unit 138 within vehicle 11. Environment control unit 138 may be configured to provide heating and/or cooling to vehicle. In some embodiments, environment control unit 138 is disposed on the inside roof of vehicle 11. However, it will be appreciated that environment control unit 138 may be integrated into vehicle 11, similar to an automobile, or coupled elsewhere on vehicle 11. In some embodiments, environment control unit 138 may be configured to operate with the deployment and storage of vehicle enclosure system 10. For example, deployment of vehicle enclosure system 10 may turn on environment control unit 138 and storage of vehicle enclosure system 10 may turn off environment control unit 138. In other embodiments, environment control unit 138 can be operated with an input/output device (e.g., button or switch) on environment control unit 138 or through a command from a computing device, such as computing device 200 described in more detail below.

Front window 115 and back window 118 may be manually operated individually or simultaneously with covering 23 and rear cover assembly 26. Front window 115 and back window 118 may also be mechanically operated with an input/output device as discussed herein. In some embodiments, front window 115 and back window 118 are made of the same material as covering 23. In other embodiments, front window 115 and/or back window 118 are made of a different material than covering 23.

Referring back to FIGS. 1A-1B and FIGS. 3A-3C, vehicle enclosure system 10 may also include a pod 121 operatively coupled to housing 20. For example, pod 121 may be coupled to the back or side of housing 20. Pod 121 defines a void therein and has a cap 124 and a cup 127. Pod 121 may be used to store a divot filler (not shown), such as sand, used to fill in divots from golf shots. For example, cap 124 of pod 121 may be opened and closed to facilitate loading the divot filler into pod 121. In some embodiments, containers full of sand used to fill divots may be turned upside down and placed into pod 121. When a divot needs to be filled, cup 127 can be pulled out of pod 121 filled with the divot filler to be used to fill a divot. In some embodiments, when cup 127 is pulled out or removed from pod 121, a gate (not shown) slides or rotates into place, blocking the divot filler from emptying out of pod 121. Although pod 121 is coupled to the side or back of housing 20 according to the present disclosure, it will be appreciated that pod 121 may be coupled to the front of housing 20 or elsewhere on the vehicle enclosure system 10 or vehicle 11 in other embodiments.

Figure 18:
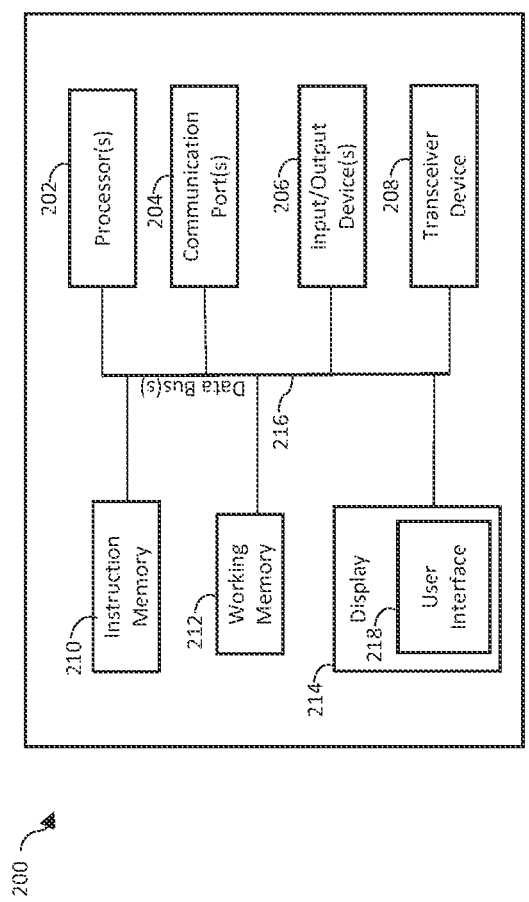
FIG. 18 illustrates a block diagram of an exemplary computing device of a vehicle enclosure device in accordance with some embodiments.

FIG. 18 illustrates a block diagram of an exemplary computing device 200 of vehicle enclosure system 10 in accordance with some embodiments. The computing device 200 can be employed by a disclosed system or used to execute a disclosed method of the present disclosure. For example, computing device 200 may be a computing device configured to operate motor 110 or a separate controller, such as a smartphone or remote, configured to wirelessly communicate with computing device communicatively coupled to motor 110. It should be understood, however, that other computing device configurations are possible.

Computing device 200 can include one or more processors 202, one or more communication port(s) 204, one or more input/output devices 206, a transceiver device 208, instruction memory 210, working memory 212, and optionally a display 214, all operatively coupled to one or more data buses 216. Data buses 216 allow for communication among the various devices, processor(s) 202, instruction memory 210, working memory 212, communication port(s) 204, and/or display 214. Data buses 216 can include wired, or wireless, communication channels. Data buses 216 are connected to one or more devices.

Processor(s) 202 can include one or more distinct processors, each having one or more cores. Each of the distinct processors 202 can have the same or different structures. Processor(s) 202 can include one or more central processing units (CPUs), one or more graphics processing units (GPUs), application specific integrated circuits (ASICs), digital signal processors (DSPs), and the like.

Processor(s) 202 can be configured to perform a certain function or operation by executing code, stored on instruction memory 210, embodying the function or operation of the computing device coupled to motor 110 or remote. For example, processor(s) 202 can be configured to perform one or more of any function, method, or operation disclosed herein.

Communication port(s) 204 can include, for example, a serial port such as a universal asynchronous receiver/transmitter (UART) connection, a Universal Serial Bus (USB) connection, or any other suitable communication port or connection. In some examples, communication port(s) 204 allows for the programming of executable instructions in instruction memory 210. In some examples, communication port(s) 204 allow for the transfer, such as uploading or downloading, of data.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Transceiver device 208 can allow for communication with a network, such as a Wi-Fi network, an Ethernet network, a cellular network, radio signals, Bluetooth, or any other suitable communication network. For example, if operating in a cellular network, transceiver device 208 is configured to allow communications with the cellular network. Processor(s) 202 is operable to receive data from, or send data to, a network via transceiver device 208.

Instruction memory 210 can include an instruction memory 210 that can store instructions that can be accessed (e.g., read) and executed by processor(s) 202. For example, the instruction memory 210 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 210 can store instructions that, when executed by one or more processors 202, cause one or more processors 202 to perform one or more of the operations of the vehicle enclosure system 10.

In addition to instruction memory 210, the computing device 200 can also include a working memory 212. Processor(s) 202 can store data to, and read data from, the working memory 212. For example, processor(s) 202 can store a working set of instructions to the working memory 212, such as instructions loaded from the instruction memory 210. Processor(s) 202 can also use the working memory 212 to store dynamic data created during the operation of computing device 200. The working memory 212 can be a random access memory (RAM) such as a static random access memory (SRAM) or dynamic random access memory (DRAM), or any other suitable memory.

Display 214 is configured to display user interface 218. User interface 218 can enable user interaction with computing device 200. In some examples, a user can interact with user interface 218 by engaging input/output devices 206. In some examples, display 214 can be a touchscreen, where user interface 218 is displayed on the touchscreen.

Vehicle enclosure system 10 can be configured for use in a plurality of different vehicles 11. For example, vehicle enclosure system 10 may be used to enclose an interior of a golf cart. Vehicle enclosure system 10 may be custom installed on both sides of vehicle 11. For example, installation of vehicle enclosure system 10 can include: (1) adjusting the size of top rail 13, bottom rail 16, and magnetic bracket 29 based on the size of vehicle 11; (2) installing top rail 13, bottom rail 16, housing 20, rear cover assembly 26, and magnetic bracket 29; (3) custom trimming covering 23 and variable covering 105 fit vehicle 11; and (4) adjusting rear cover assembly 26 based on the size of the vehicle so that it adequately covers back portion 35.

Figure 19:
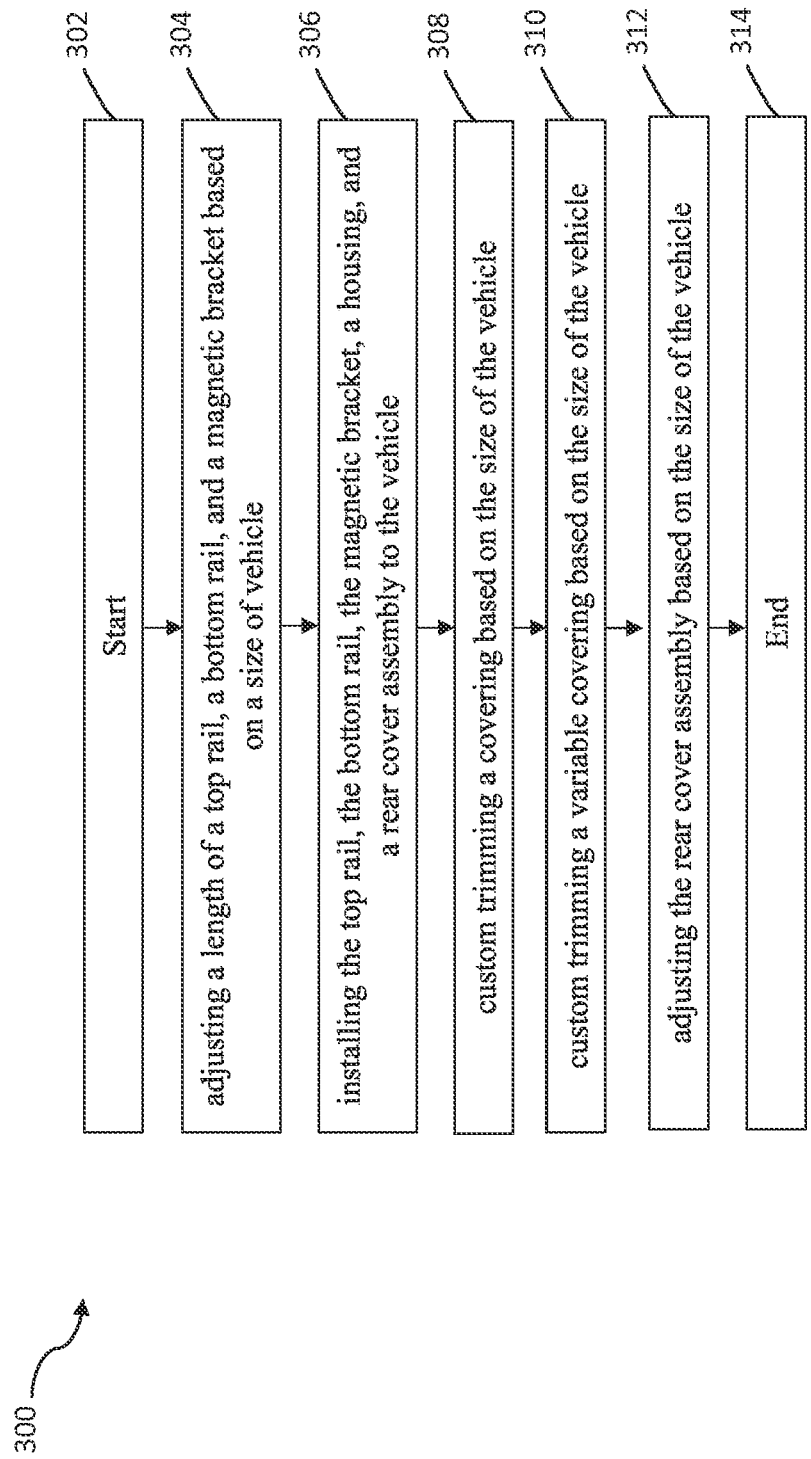
FIG. 19 illustrates a flowchart of a method of installing a vehicle enclosure system in accordance with some embodiments.

FIG. 19 illustrates a flowchart of a method 300 of installing a vehicle enclosure system 10 in accordance with some embodiments. Method 300 begins at step 302. Method 300 may also include the step 304 of adjusting a length of a top rail 13, a bottom rail 16, and a magnetic bracket 29 based on a size of vehicle 11. Method 300 may also the step 306 of installing the top rail 13, the bottom rail 16, the magnetic bracket 29, a housing 20, and a rear cover assembly 26 to the vehicle 11. Method 300 may also include the step 308 of custom trimming a covering 23 based on the size of the vehicle 11. Method 300 may also include the step 310 of custom trimming a variable covering 105 based on the size of the vehicle 11. Method 300 may also include the step 312 of adjusting the rear cover assembly 26 based on the size of the vehicle 11. Method 300 may then end at step 314.

In some embodiments, method 300 may also include a step of adjusting a length of left track 124 and right track 126 for front window 119. Method 300 may also include a step of adjusting a length of left track 134 and right track 135 for back window 133. Method 300 may also include a step of installing left track 124 and right track 126 for front window 119. Method 300 may also include a step of installing left track 134 and right track 135 for back window 132. Method 300 may also include a step of installing an environment control unit 138.

Figure 20:
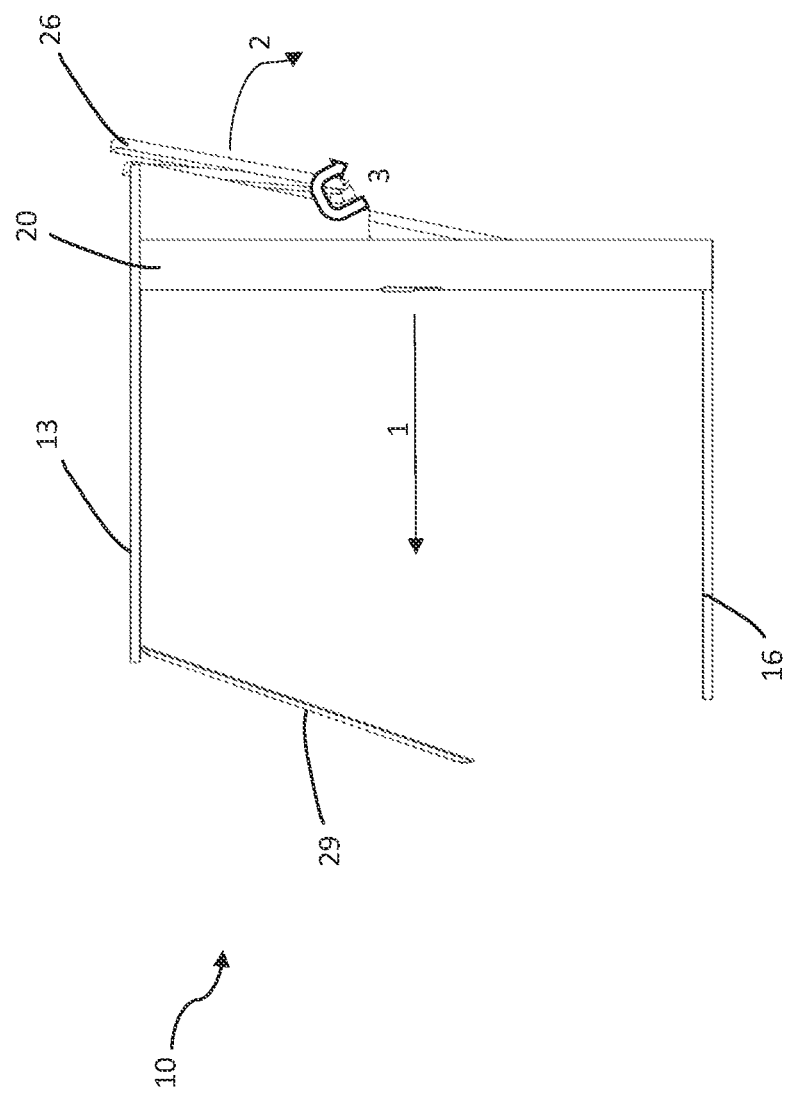
FIG. 20 illustrates deployment of a vehicle enclosure system in accordance with some embodiments.

FIG. 20 illustrates deployment of vehicle enclosure system 10 in accordance with some embodiments. As illustrated by directional arrow 1 in FIG. 20, once vehicle enclosure system 10 has been installed, the interior of vehicle 11 (e.g., golf cart) may be enclosed by sliding covering 23 on left side 38 and/or right side 41 from the storage position to a deployed position. Covering 23 may be operated manually with handle 68 or remotely through the use of one or more computing devices 200 and motor 110. For example, in some embodiments, a user may use a controller to communicate with computing device 200 to operate motor 110 to store or deploy vehicle enclosure system 10. In some embodiments, a user may send a command from an application on a controller, such as a smartphone, to computing device 200 to operate motor 110. It will be appreciated that a plurality of computing devices 200 can embody the computing device electrically connected to motor 110 and separately the controller (e.g., remote, smartphone, etc.). In some embodiments, to completely seal vehicle 11, a second handle 108 attached to variable covering 105 is pulled and rotated so that interlocking attachment 107 is magnetically attached to magnetic bracket 29.

As illustrated by directional arrows 2 and 3 in FIG. 20, operation of covering 23 to enclose left side 38 and/or right side 41 simultaneously operates rear cover assembly 26 on each of the left side 38 and right side 41, respectively. Meaning operation of covering 23 to enclose vehicle 11 on the left side 38 also deploys rear cover assembly 26 on the left side 38 to cover at least a portion of back portion 35, and vice versa. Although vehicle enclosure system 10 is configured to be operated independently on each side (i.e., left side and right side) of vehicle 11, it is contemplated that operation of one side could enclose vehicle 11 on both sides and deploy rear cover assembly 26 on both sides or even one large rear cover assembly 26 configured to cover the entire back portion 35.

In some embodiments, locking mechanism 67 may be configured to also keep rear cover assembly 26 lowered when covering 23 is stored and deployed (i.e., opened and closed) so that items in back portion 35 remain covered upon entry and exit of vehicle 11. Additionally, release mechanism 101 may be configured to release rear cover assembly 26 so that a user may deploy or store rear cover assembly 26 (i.e., raise and lower) even though covering 23 is in a deployed state. For example, a user playing golf may want to keep rear cover assembly 26 deployed until the user is ready to select a particular club so that the user's golf clubs stay as dry as possible. When the user is ready to select a club, the user can operate release mechanism 101 to release rear cover assembly 26 and individually raise rear cover assembly 26 and expose back portion 35 while covering 23 remains in its current stored or deployed state.

Figure 21:
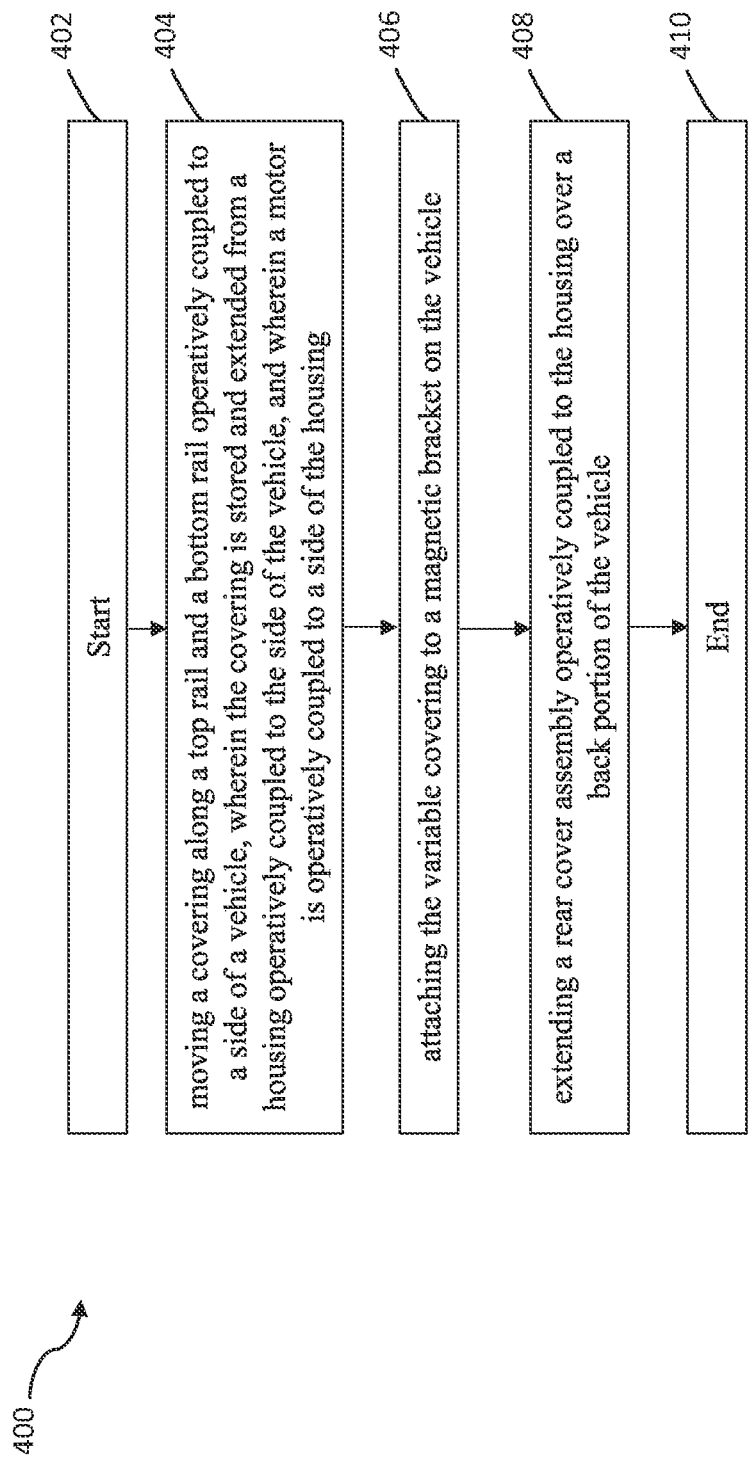
FIG. 21 illustrates a flowchart of a method of using a vehicle enclosure system in accordance with some embodiments.

FIG. 21 illustrates flowchart of a method 400 of using vehicle enclosure system 10 in accordance with some embodiments. Method 400 starts at step 402. Method 400 may also include the step 404 of moving a covering 23 along a top rail 13 and a bottom rail 16 operatively coupled to a side (e.g., left side 38 or right side 41) of a vehicle 11. The covering 23 may be stored and extended from a housing 20 operatively coupled to the side 38 or 41 of the vehicle 11. A motor 110 may be operatively coupled to a side 38 or 41 of the housing 20. Method 400 may also include the step 406 of attaching the variable covering 105 to a magnetic bracket 29 on the vehicle 11. Method 400 may also include the step 408 of extending a rear cover assembly 26 operatively coupled to the housing 20 over a back portion 35 of the vehicle 11. Method 400 then ends at step 410.

In some embodiments, method 400 may include opening rear cover assembly 26, exposing the back portion 35 of the vehicle 11. The method 400 may also include locking rear cover assembly 26 so that rear cover assembly 26 remains in a closed position when the covering 23 is moved along the top rail 13 and the bottom rail 16. In some embodiments, method 400 may also include manual operation of moving the covering 23, attaching the variable covering 105, and extending the rear cover assembly 26. In some embodiments, method 400 may also include motor operation of moving the covering 23, attaching the variable covering 105, and extending the rear cover assembly 26. Method 400 may also include deploying a front window 119 along a left track 124 and a right track 126. Method 400 may also include deploying a back window 132 along a left track 134 and a right track. Method 400 may also include operating an environment control unit 138.

Features of the Vehicle Enclosure System

In some embodiments, a vehicle enclosure system may include a top rail and a bottom rail coupled to a side of a vehicle. The vehicle enclosure system may also include a housing coupled to the side of the vehicle. The housing may include a covering coupled to at least one handle. The at least one handle may be configured to facilitate a movement of the covering by a user. The housing may include a roller configured to facilitate the movement and storage of the covering. The vehicle enclosure system may include a rear cover assembly coupled to the housing and the covering. The covering may enclose an interior of the vehicle and extend the rear cover assembly simultaneously when the covering is moved to a deployed position. The covering may expose the interior of the vehicle and store the rear cover assembly simultaneously when the covering is moved to a storage position.

In some embodiments, a magnetic bracket may be coupled to the side of the vehicle configured to enclose a forward portion of the vehicle.

In some embodiments, the at least one handle may include a first handle and a second handle coupled to the covering. The first handle may be coupled to the covering and configured to move the covering along the top rail and the bottom rail. The second handle may be configured to rotate forward to enclose a forward portion of the vehicle.

In some embodiments, the covering may be configured to be manually operated with a pulley system.

In some embodiments, the covering may be configured to be operated with a motor coupled to a side of the housing.

In some embodiments, the covering may be remotely operated with a controller communicatively coupled to the motor.

In some embodiments, the covering may be operated with a command on an application of the controller.

In some embodiments, the motor may be communicatively coupled to the controller through at least one of radio signal, Wi-Fi, and Bluetooth.

In some embodiments, the rear cover assembly may include, a frame coupled to the housing, a linkage coupled to the housing, a shield attached to the frame and configured to cover a back portion of the vehicle, and a torsion spring configured to rotate the frame.

In some embodiments, the frame may be configured to telescope to fit a plurality of different vehicles.

In some embodiments, a release mechanism may be configured to release the rear cover assembly.

In some embodiments, the covering may be made of a waterproof and ultraviolet ray resistant material.

In some embodiments, the covering may be a fabric material.

In some embodiments, the covering may include an interlocking attachment configured to be adaptable for custom trimming of the fabric material to fit a plurality of different vehicles.

In some embodiments, a front window may be coupled to a front of the vehicle.

In some embodiments, a back window may be coupled to a back of the vehicle.

In some embodiments, vehicle enclosure system may include an environment control unit.

In some embodiments, a vehicle enclosure system includes a top rail and a bottom rail coupled to each of a left side and a right side of a vehicle. The vehicle enclosure system may include a housing coupled to each of the left side and the right side of the vehicle. The housing on each of the left side and the right side of the vehicle may include a covering coupled to at least one handle. The at least one handle may be configured to facilitate a movement of the covering by a user. The housing may include a roller configured to facilitate the movement and storage of the covering. The vehicle enclosure system may include a motor coupled to the side of the housing and comprising a clutch configured to engage and disengage the roller. The vehicle enclosure system may include a rear cover assembly coupled to the housing on each of the left side and the right side. The covering on the left side and the right side may enclose an interior on the respective left and right side of the vehicle and extend the rear cover assembly on the respective left side and the right side of the vehicle simultaneously when the covering on the left side and right side is moved to a deployed position. The covering may expose the interior on the respective left side and the right side of the vehicle and store the rear cover assembly on the respective left side and the right side simultaneously when the covering is moved to a storage position.

In some embodiments, a magnetic bracket may be coupled to each of the right side and the left side of the vehicle and configured to enclosure a forward portion on each of the right side and the left side of the vehicle.

In some embodiments, the at least one handle may include a first handle and a second handle coupled to the covering on each of the left side and the right side. The first handle may be coupled to the covering and configured to move along the top rail and the bottom rail on each of the left side and the right side. The second handle may be configured to rotate forward to enclose a forward portion of each of the left side and the right side.

In some embodiments, the covering on each of the right side and the left side may be configured to operate individually.

In some embodiments, the covering may be configured to be manually operated with a pulley system.

In some embodiments, the covering may be remotely operated with a controller communicatively coupled to the motor.

In some embodiments, the covering may be operated with a command on an application of the controller.

In some embodiments, the motor may be communicatively coupled to the controller through at least one of a radio signal, Wi-Fi, and Bluetooth.

In some embodiments, the rear cover assembly on each of the left side and the right side of the vehicle may include, a frame coupled to the housing, a linkage coupled to the housing, a shield attached to the frame and configured to cover a back portion of the vehicle, and a torsion spring configured to rotate the frame.

In some embodiments, the frame may be configured to telescope to fit a plurality of different vehicles.

In some embodiments, a release mechanism may be configured to release the rear cover assembly.

In some embodiments, the covering may be made of a waterproof and ultraviolet ray resistant material.

In some embodiments, the covering may be a fabric material.

In some embodiments, the covering may include an interlocking attachment configured to be adaptable for custom trimming of the fabric material to fit a plurality of different vehicles.

In some embodiments, a front window may be coupled to a front of the vehicle.

In some embodiments, a back window may be coupled to a back of the vehicle.

In some embodiments, vehicle enclosure system may include an environment control unit.

In some embodiments, a method may include moving a covering along a top rail and a bottom rail coupled to a side of a vehicle. The covering may be stored and extended from a housing coupled to the side of the vehicle. A motor may be coupled to a side of the housing. The method may include attaching a variable covering to a magnetic bracket on the vehicle. The method may include extending a rear cover assembly coupled to the housing over a back portion of the vehicle.

In some embodiments, the covering may be moved, the variable covering may be attached, and the rear cover assembly may be extended manually.

In some embodiments, the covering may be moved, the variable covering may be attached, and the rear cover assembly may be extended based on operation of the motor.

In some embodiments, the method may include moving a front window on a front of the vehicle.

In some embodiments, the method may include moving a back window on a back of the vehicle.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

It may be emphasized that the above-described embodiments, particularly any "preferred" embodiments, are merely possible examples of implementations, set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A vehicle enclosure system comprising:
   a top rail and a bottom rail coupled to a side of a vehicle;
   a housing coupled to the side of the vehicle, wherein the housing comprises:
      a covering coupled to at least one handle, wherein the at least one handle is configured to facilitate a movement of the covering by a user;
      a roller configured to facilitate the movement and storage of the covering; and
   a rear cover assembly coupled to the housing and the covering,
   wherein the covering encloses an interior of the vehicle and extends the rear cover assembly simultaneously when the covering is moved to a deployed position, and the covering exposes the interior of the vehicle and stores the rear cover assembly simultaneously when the covering is moved to a storage position.

2. The vehicle enclosure system of claim 1, further comprising a magnetic bracket coupled to the side of the vehicle configured to enclose a forward portion of the vehicle.

3. The vehicle enclosure system of claim 1, wherein the at least one handle comprises a first handle and a second handle coupled to the covering, and wherein the first handle is coupled to the covering and configured to move the covering along the top rail and the bottom rail, and the second handle is configured to rotate forward to enclose a forward portion of the vehicle.

4. The vehicle enclosure system of claim 1, wherein the covering is configured to be manually operated with a pulley system.

5. The vehicle enclosure system of claim 1, wherein the covering is configured to be operated with a motor coupled to a side of the housing.

6. The vehicle enclosure system of claim 5, wherein the covering is remotely operated with a controller communicatively coupled to the motor.

7. The vehicle enclosure system of claim 6, wherein the covering is operated with a command on an application of the controller.

8. The vehicle enclosure system of claim 7, wherein the motor is communicatively coupled to the controller through at least one of radio signal, Wi-Fi, and Bluetooth.

9. The vehicle enclosure system of claim 1, wherein the rear cover assembly comprises:
   a frame coupled to the housing;
   a linkage coupled to the housing;
   a shield attached to the frame and configured to cover a back portion of the vehicle; and
   a rotation mechanism configured to rotate the frame.

10. The vehicle enclosure system of claim 9, wherein the frame is configured to telescope to fit a plurality of different vehicles.

11. The vehicle enclosure system of claim 1, wherein the covering is made of a waterproof and ultraviolet ray resistant material.

12. The vehicle enclosure system of claim 1, further comprising a front window coupled to a front of the vehicle.

13. The vehicle enclosure system of claim 1, further comprising a back window coupled to a back of the vehicle.

14. A vehicle enclosure system comprising:
   a top rail and a bottom rail coupled to each of a left side and a right side of a vehicle;

a housing coupled to each of the left side and the right side of the vehicle, wherein the housing on each of the left side and the right side of the vehicle comprises:
- a covering coupled to at least one handle, wherein the at least one handle is configured to facilitate a movement of the covering by a user;
- a roller configured to facilitate the movement and storage of the covering;

a motor coupled to the side of the housing and comprising a clutch configured to engage and disengage the roller; and a rear cover assembly coupled to the housing on each of the left side and the right side, wherein the covering on the left side and the right side encloses an interior on the respective left and right side of the vehicle and extends the rear cover assembly on the respective left side and the right side of the vehicle simultaneously when the covering on the left side and right side is moved to a deployed position, and the covering exposes the interior on the respective left side and the right side of the vehicle and stores the rear cover assembly on the respective left side and the right side simultaneously when the covering is moved to a storage position.

15. The vehicle enclosure system of claim 14, further comprising a magnetic bracket coupled to each of the right side and the left side of the vehicle and configured to enclose a forward portion on each of the right side and the left side of the vehicle.

16. The vehicle enclosure system of claim 14, wherein the at least one handle comprises a first handle and a second handle coupled to the covering on each of the left side and the right side, and wherein the first handle is coupled to the covering and configured to move along the top rail and the bottom rail on each of the left side and the right side, and the second handle is configured to rotate forward to enclose a forward portion of each of the left side and the right side.

17. The vehicle enclosure system of claim 14, wherein the covering is configured to be manually operated with a pulley system.

18. The vehicle enclosure system of claim 14, wherein the covering is remotely operated with a controller communicatively coupled to the motor.

19. The vehicle enclosure system of claim 18, wherein the covering is operated with a command on an application of the controller.

20. The vehicle enclosure system of claim 19, wherein the motor is communicatively coupled to the controller through at least one of a radio signal, Wi-Fi, and Bluetooth.

21. The vehicle enclosure system of claim 14, wherein the rear cover assembly on each of the left side and the right side of the vehicle comprises:
- a frame coupled to the housing;
- a linkage coupled to the housing;
- a shield attached to the frame and configured to cover a back portion of the vehicle; and
- a rotation mechanism configured to rotate the frame.

22. The vehicle enclosure system of claim 21, wherein the frame is configured to telescope to fit a plurality of different vehicles.

23. The vehicle enclosure system of claim 14, wherein the covering is made of a waterproof and ultraviolet ray resistant material.

24. The vehicle enclosure system of claim 14, further comprising a front window coupled to a front of the vehicle.

25. The vehicle enclosure system of claim 14, further comprising a back window coupled to a back of the vehicle.

26. A method comprising:
- moving a covering along a top rail and a bottom rail coupled to a side of a vehicle, wherein the covering is stored and extended from a housing coupled to the side of the vehicle, and wherein a motor is coupled to a side of the housing;
- attaching a variable covering to a magnetic bracket on the vehicle; and
- extending a rear cover assembly coupled to the housing over a back portion of the vehicle, wherein the moving of the covering occurs simultaneously with the extending of the rear cover assembly.

27. The method of claim 26, wherein the covering is moved, the variable covering is attached, and the rear cover assembly is extended manually.

28. The method of claim 26, wherein the covering is moved, the variable covering is attached, and the rear cover assembly is extended based on operation of the motor.

29. The method of claim 26, further comprising moving a front window on a front of the vehicle.

30. The method of claim 26, further comprising moving a back window on a back of the vehicle.

* * * * *